(12) United States Patent
Karabin et al.

(10) Patent No.: US 6,190,525 B1
(45) Date of Patent: Feb. 20, 2001

(54) ELECTRODEPOSITION BATHS CONTAINING YTTRIUM

(75) Inventors: Richard F. Karabin, Ruffs Dale; Alan J. Kaylo, Glenshaw, both of PA (US)

(73) Assignee: PPG Industries Ohio, Inc., Cleveland, OH (US)

( * ) Notice: Under 35 U.S.C. 154(b), the term of this patent shall be extended for 0 days.

(21) Appl. No.: 09/298,104

(22) Filed: Apr. 22, 1999

(51) Int. Cl.$^7$ .................................................. C25D 13/10
(52) U.S. Cl. .......................... 204/489; 204/493; 204/500; 204/506; 524/901
(58) Field of Search .................................... 204/489, 506, 204/493, 500; 524/901

(56) References Cited

U.S. PATENT DOCUMENTS

| | | | |
|---|---|---|---|
| 4,789,441 | 12/1988 | Foster et al. | 204/37.1 |
| 5,277,709 | * 1/1994 | Armstrong et al. | 524/288 |
| 5,298,148 | 3/1994 | Yasuoka et al. | 205/50 |

FOREIGN PATENT DOCUMENTS 2000508   2/2000   (JP) .

* cited by examiner

*Primary Examiner*—Kishor Mayekar
(74) *Attorney, Agent, or Firm*—William J. Uhl; Deborah M. Altman

(57) ABSTRACT

Disclosed are improved electrodeposition bath compositions comprising a resinous phase dispersed in an aqueous medium, the resinous phase being comprised of an active hydrogen containing ionic electrodepositable resin and a curing agent, where the improvement comprises the addition to an electrodeposition bath of at least one source of yttrium in an amount of about 10 to 10,000 parts per million of total yttrium based on electrodeposition bath weight. The electrodeposition bath compositions are preferably cationic and provide for excellent corrosion resistance over a variety of metal substrates including untreated steel. Also disclosed is a method of electrocoating a conductive substrate using the improved electrodeposition bath compositions of the invention. Metallic substrates which are coated using the method of the invention are also disclosed.

27 Claims, No Drawings

ELECTRODEPOSITION BATHS CONTAINING YTTRIUM

FIELD OF THE INVENTION

The present invention relates to improved coating compositions and, in particular, to electrodeposition baths containing a resinous phase dispersed in an aqueous medium, the resinous phase comprised of an ionic electrodepositable resin, a curing agent therefor, a source of yttrium; and to their use in the method of electrodeposition.

BACKGROUND OF THE INVENTION

Electrodeposition as a coating application method involves deposition of a film-forming composition onto a conductive substrate under the influence of an applied electrical potential. Electrodeposition has become increasingly important in the coatings industry because, by comparison with non-electrophoretic coating means, electrodeposition offers increased paint utilization, improved corrosion protection and low environmental contamination.

Initially, electrodeposition was conducted with the workpiece being coated serving as the anode. This was familiarly referred to as anionic electrodeposition. However, in 1972, cationic electrodeposition was introduced commercially. Since that time, cationic electrodeposition has steadily gained in popularity and today is by far the most prevalent method of electrodeposition. Throughout the world, more than 80 percent of all motor vehicles produced are given a primer coating by cationic electrodeposition.

Typically, electrodepositable coatings comprise an electrodepositable film-forming polymer and a curing agent, in combination with, inter alia, pigments. Lead-containing pigments such as lead silica chromate, basic lead silicate, lead chromate, and lead sulfate are often used in electrodepositable coatings because they impart excellent corrosion resistance to the electrocoated article. However, the acid used in cationic electrodeposition baths often solubilizes a portion of the lead pigment forming lead salts which are soluble in the aqueous phase of the electrodeposition bath. These lead salts often find their way into the ultrafiltrate of the bath, thus necessitating the removal and subsequent disposal of metallic lead and/or ionic or organic lead-containing materials.

In recent years, due to environmental concerns, particularly in Europe and Japan, the use of lead-free coatings has been mandated. Although surface coatings of excellent quality can be achieved by means of cationic electrodeposition of lead-free coatings, the removal of corrosion inhibitive lead pigments can result in reduced corrosion resistance of these coatings, particularly when applied to untreated or poorly pretreated steel substrates.

U.S. Pat. No. 4,789,441 discloses a metallic coating on a substrate applied by composite electrodeposition of a metallic matrix of nickel, cobalt or iron which contains particles of $CrAlM_2$ where $M_2$ is yttrium, silicon, or titanium. The composite electrodeposition metallic coating imparts corrosion resistance to substrates which are used in aggressive media and is particularly useful for coating gas turbine blades. This "coating" is completely metallic in nature and must be fused with the substrate at temperatures of greater than 700° C., preferably over 1100° C. in order to achieve diffusion of the deposited metals into the substrate. Such coatings are unsuitable for general use in common industrial painting applications.

The use of yttrium to improve corrosion resistance of conventional organic coatings is not known in the art. Nor is the effectiveness of yttrium as a corrosion inhibitor in conventional, cationic electrodepositable coatings known. It, therefore, would be advantageous to provide a lead-free electrodeposition bath containing a yttrium source which provides improved corrosion resistance of the electrocoated metal substrates, especially untreated steel.

SUMMARY OF THE INVENTION

In accordance with the present invention, a coating composition comprising (a) an active hydrogen group-containing resin and (b) a curing agent having functional groups reactive with the active hydrogen groups of (a). The composition contains yttrium or a compound of yttrium in an amount of about 0.005 to 5 percent, preferably not more than 2.5 percent, and more preferably not more than 1.0 percent by weight of yttrium (measured as elemental yttrium) based on weight of total resin solids.

In a particular embodiment, the invention resides in an electrodeposition bath, having improved corrosion resistance, comprising a resinous phase dispersed in an aqueous medium. The resinous phase comprises the following components:

(a) an active hydrogen-group containing ionic electrodepositable resin, and (b) a curing agent having functional groups reactive with the active hydrogen groups of (a). Yttrium or a compound of yttrium is present in the electrodeposition bath in an amount from about 10 to about 10,000 parts per million of total yttrium (measured as elemental yttrium) based on electrodeposition bath weight.

Also provided is a method of electrocoating a conductive substrate serving as a charged electrode in an electrical circuit comprising the electrode and an oppositely charged counter electrode which are immersed in an aqueous electrodeposition bath described above, and metallic substrates coated by the method.

DETAILED DESCRIPTION OF THE INVENTION

Generally, the electrodeposition bath of the present invention comprises a resinous phase dispersed in an aqueous medium wherein the resinous phase comprises the following components:

(a) an active hydrogen group-containing ionic electrodepositable resin, and (b) a curing agent having functional groups reactive with the active hydrogen groups of (a), wherein the improvement comprises an electrodeposition bath containing yttrium present in an amount from about 10 to about 10,000 parts per million, preferably not more than about 5,000 parts per million, and more preferably not more than about 1,000 parts per million, of total yttrium (measured as elemental yttrium).

At levels lower than 10 parts per million total yttrium, based on electrodeposition bath weight, no appreciable improvement in corrosion resistance of the electrocoated substrate is observed. At levels of yttrium greater than 10,000 ppm stability and application characteristics of the electrocoating bath compositions can be negatively effected.

Both soluble and insoluble yttrium compounds may serve as the source of yttrium in the electrodeposition baths of the invention. Examples of yttrium sources suitable for use in the lead-free electrodeposition bath of the present invention are soluble organic and inorganic yttrium salts such as yttrium acetate, yttrium chloride, yttrium formate, yttrium carbonate, yttrium sulfamate, yttrium lactate and yttrium nitrate. When the yttrium is to be added to an electrocoat bath as an aqueous solution, yttrium nitrate, a readily available yttrium compound, is a preferred yttrium source. Other yttrium compounds suitable for use in the electrodeposition baths of the present invention are organic and inorganic yttrium compounds such as yttrium oxide, yttrium bromide, yttrium hydroxide, yttrium molybdate, yttrium sulfate, yttrium silicate, and yttrium oxalate. Organoyttrium complexes and yttrium metal can also be used. When the yttrium is to be incorporated into an electrocoat bath as a component in the pigment paste, yttrium oxide is the preferred source of yttrium.

Besides the aforementioned yttrium compounds, the electrodeposition baths of the present invention also contain, as a main film-forming polymer, an active hydrogen-containing ionic, preferably cationic, electrodepositable resin. A wide variety of electrodepositable film-forming polymers are known and can be used in the electrodeposition baths of the invention so long as the polymers are "water dispersible," i.e., adapted to be solubilized, dispersed or emulsified in water. The water dispersible polymer is ionic in nature, that is, the polymer will contain anionic functional groups to impart a negative charge or, as is preferred, cationic functional groups to impart a positive charge.

Examples of film-forming resins suitable for use in anionic electrodeposition bath compositions are base-solubilized, carboxylic acid containing polymers such as the reaction product or adduct of a drying oil or semi-drying fatty acid ester with a dicarboxylic acid or anhydride; and the reaction product of a fatty acid ester, unsaturated acid or anhydride and any additional unsaturated modifying materials which are further reacted with polyol. Also suitable are the at least partially neutralized interpolymers of hydroxyalkyl esters of unsaturated carboxylic acids, unsaturated carboxylic acid and at least one other ethylenically unsaturated monomer. Still another suitable electrodepositable resin comprises an alkyd-aminoplast vehicle, i.e., a vehicle containing an alkyd resin and an amine-aldehyde resin. Yet another anionic electrodepositable resin composition comprises mixed esters of a resinous polyol. These compositions are described in detail in U.S. Pat. No. 3,749,657 at col. 9, lines 1 to 75 and col. 10, lines 1 to 13, all of which are herein incorporated by reference. Other acid functional polymers can also be used such as phosphatized polyepoxide or phosphatized acrylic polymers as are well known to those skilled in the art.

As aforementioned, it is preferred that the active hydrogen-containing ionic electrodepositable resin (a) is cationic and capable of deposition on a cathode. Examples of such cationic film-forming resins include amine salt group-containing resins such as the acid-solubilized reaction products of polyepoxides and primary or secondary amines such as those described in U.S. Pat. Nos. 3,663,389; 3,984, 299; 3,947,338; and 3,947,339. Usually, these amine salt group-containing resins are used in combination with a blocked isocyanate curing agent. The isocyanate can be fully blocked as described in the aforementioned U.S. Pat. No. 3,984,299 or the isocyanate can be partially blocked and reacted with the resin backbone such as described in U.S. Pat. No. 3,947,338. Also, one-component compositions as described in U.S. Pat. No. 4,134,866 and DE-OS No. 2,707,405 can be used as the film-forming resin. Besides the epoxy-amine reaction products, film-forming resins can also be selected from cationic acrylic resins such as those described in U.S. Pat. Nos. 3,455,806 and 3,928,157.

Besides amine salt group-containing resins, quaternary ammonium salt group-containing resins can also be employed. Examples of these resins are those which are formed from reacting an organic polyepoxide with a tertiary amine salt. Such resins are described in U.S. Pat. Nos. 3,962,165; 3,975,346; and 4,001,101. Examples of other cationic resins are ternary sulfonium salt group-containing resins and quaternary phosphonium salt-group containing resins such as those described in U.S. Pat. Nos. 3,793,278 and 3,984,922, respectively. Also, film-forming resins which cure via transesterification such as described in European Application No. 12463 can be used. Further, cationic compositions prepared from Mannich bases such as described in U.S. Pat. No. 4,134,932 can be used.

The resins to which the present invention is particularly effective are those positively charged resins which contain primary and/or secondary amine groups. Such resins are described in U.S. Pat. Nos. 3,663,389; 3,947,339; and 4,116, 900. In U.S. Pat. No. 3,947,339, a polyketimine derivative of a polyamine such as diethylenetriamine or triethylenetetraamine is reacted with a polyepoxide. When the reaction product is neutralized with acid and dispersed in water. free primary amine groups are generated. Also, equivalent products are formed when polyepoxide is reacted with excess polyamines such as diethylenetriamine and triethylenetetraamine and the excess polyamine vacuum stripped from the reaction mixture. Such products are described in U.S. Pat. Nos. 3,663,389 and 4,116,900.

The active hydrogen-containing ionic electrodepositable resin described above is present in the electrodeposition bath of the invention in amounts of about 1 to about 60 percent by weight, preferably about 5 to about 25 based on total weight of the electrodeposition bath.

The resinous phase of the electrodeposition bath of the present invention further comprises (b) a curing agent adapted to react with the active hydrogen groups of the ionic electrodepositable resin (a) described immediately above. Both blocked organic polyisocyanate and aminoplast curing agents are suitable for use in the present invention, although blocked isocyanates are preferred herein for cathodic electrodeposition.

Aminoplast resins, which are the preferred curing agent for anionic electrodeposition, are the condensation products of amines or amides with aldehydes. Examples of suitable amine or amides are melamine, benzoguanamine, urea and similar compounds. Generally, the aldehyde employed is formaldehyde, although products can be made from other aldehydes such as acetaldehyde and furfural. The condensation products contain methylol groups or similar alkylol groups depending on the particular aldehyde employed. Preferably, these methylol groups are etherified by reaction with an alcohol. Various alcohols employed include monohydric alcohols containing from 1 to 4 carbon atoms such as methanol, ethanol, isopropanol, and n-butanol, with methanol being preferred. Aminoplast resins are commercially available from American Cyanamid Co. under the trademark CYMEL and from Monsanto Chemical Co. under the trademark RESIMENE.

The aminoplast curing agents are typically utilized in conjunction with the active hydrogen containing anionic electrodepositable resin in amounts ranging from about 5 percent to about 60 percent by weight, preferably from about 20 percent to about 40 percent by weight, the percentages based on the total weight of the resin solids in the electrodeposition bath.

The preferred curing agents for use in cathodic electrodeposition are blocked organic polyisocyanates. The polyisocyanates can be fully blocked as described in U.S. Pat. No. 3,984,299 column 1 lines 1 to 68, column 2 and column 3 lines 1 to 15, or partially blocked and reacted with the polymer backbone as described in U.S. Pat. No. 3,947, 338 column 2 lines 65 to 68, column 3 and column 4 lines 1 to 30, which are incorporated by reference herein. By "blocked" is meant that the isocyanate groups have been reacted with a compound so that the resultant blocked isocyanate group is stable to active hydrogens at ambient temperature but reactive with active hydrogens in the film forming polymer at elevated temperatures usually between 90° C. and 200° C.

Suitable polyisocyanates include aromatic and aliphatic polyisocyanates, including cycloaliphatic polyisocyanates and representative examples include diphenylmethane-4,4'-diisocyanate (MDI), 2,4- or 2,6-toluene diisocyanate (TDI), including mixtures thereof, p-phenylene diisocyanate, tetramethylene and hexamethylene diisocyanates, dicyclohexylmethane-4,4'-diisocyanate, isophorone diisocyanate, mixtures of phenylmethane-4,4'-diisocyanate and polymethylene polyphenylisocyanate. Higher polyisocyanates such as triisocyanates can be used. An example would include triphenylmethane-4,4',4"-triisocyanate. Isocyanate ( )-prepolymers with polyols such as neopentyl glycol and trimethylolpropane and with polymeric polyols such as polycaprolactone diols and triols (NCO/OH equivalent ratio greater than 1) can also be used.

The polyisocyanate curing agents are typically utilized in conjunction with the active hydrogen containing cationic electrodepositable resin in amounts ranging from about 5 percent to about 60 percent by weight, preferably from about 20 percent to about 50 percent by weight, the percentages based on the total weight of the resin solids of the electrodeposition bath.

The aqueous compositions of the present invention are in the form of an aqueous dispersion. The term "dispersion" is believed to be a two-phase transparent, translucent or opaque resinous system in which the resin is in the dispersed phase and the water is in the continuous phase. The average particle size of the resinous phase is generally less than 1.0 and usually less than 0.5 microns, preferably less than 0.15 micron.

The concentration of the resinous phase in the aqueous medium is at least 1 and usually from about 2 to about 60 percent by weight based on total weight of the aqueous dispersion. When the compositions of the present invention are in the form of resin concentrates, they generally have a resin solids content of about 20 to about 60 percent by weight based on weight of the aqueous dispersion.

Electrodeposition baths of the invention are typically supplied as two components: (1) a clear resin feed, which includes generally the active hydrogen-containing ionic electrodepositable resin, i.e., the main film-forming polymer, the curing agent, and any additional water-dispersible, non-pigmented components; and (2) a pigment paste, which generally includes one or more pigments, a water-dispersible grind resin which can be the same or different from the main-film forming polymer, and, optionally, additives such as wetting or dispersing aids. Electrodeposition bath components (1) and (2) are dispersed in an aqueous medium which comprises water and, usually, coalescing solvents.

It should be appreciated that there are various methods by which the yttrium compound can be incorporated into the electrodeposition bath. A soluble yttrium compound may be added "neat," that is, added directly to the bath without prior blending or reacting with other components. Alternatively, a soluble yttrium compound can be added to the predispersed clear resin feed which may include the ionic resin, the curing agent and/or any other non-pigmented component. Preferably, a soluble yttrium compound is added "neat" to the electrodeposition bath. Insoluble yttrium compounds and/or yttrium pigments, on the other hand, are preferably pre-blended with the pigment paste component prior to the incorporation of the paste to the electrodeposition bath.

The electrodeposition bath of the present invention can contain yttrium as the sole corrosion inhibiting inorganic component or can be supplemented with other corrosion inhibiting inorganic or organic components such as calcium, bismuth or polyphenols such as phenol functional polymers. Preferably the electrodeposition bath is substantially free of lead.

The electrodeposition bath of the present invention has a resin solids content usually within the range of about 5 to 25 percent by weight based on total weight of the electrodeposition bath.

As aforementioned, besides water, the aqueous medium may contain a coalescing solvent. Useful coalescing solvents include hydrocarbons, alcohols, esters, ethers and ketones. The preferred coalescing solvents include alcohols, polyols and ketones. Specific coalescing solvents include isopropanol, butanol, 2-ethylhexanol, isophorone, 2-methoxypentanone, ethylene and propylene glycol and the monoethyl inonobutyl and monohexyl ethers of ethylene glycol. The amount of coalescing solvent is generally between about 0.01 and 25 percent and when used, preferably from about 0.05 to about 5 percent by weight based on total weight of the aqueous medium.

As discussed above, a pigment composition and, if desired, various additives such as surfactants, wetting agents or catalyst can be included in the dispersion. The pigment composition may be of the conventional type comprising pigments, for example, iron oxides, strontium chromate, carbon black, coal dust, titanium dioxide, talc, barium sulfate, as well as color pigments such as cadmium yellow, cadmium red, chromium yellow and the like. The pigment content of the dispersion is usually expressed as a pigment-to-resin ratio. In the practice of the invention, when pigment is employed, the pigment-to-resin ratio is usually within the range of about 0.02 to 1:1. The other additives mentioned above are usually in the dispersion in amounts of about 0.01 to 3 percent by weight based on weight of resin solids.

The electrodepositable coating compositions of the present invention can be applied by electrodeposition to a variety of electroconductive substrates especially metals such as untreated steel, galvanized steel, aluminum, copper, magnesium and conductive carbon coated materials. The applied voltage for electrodeposition may be varied and can be, for example, as low as 1 volt to as high as several thousand volts but typically between 50 and 500 volts. The current density is usually between 0.5 ampere and 5 amperes per square foot and tends to decrease during electrodeposition indicating the formation of an insulating film.

After the coating has been applied by electrodeposition, it is cured usually by baking at elevated temperatures such as about 90° to about 260° C. for about 1 to about 40 minutes.

Illustrating the invention are the following examples which, however, are not to be considered as limiting the invention to their details. All parts and percentages in the following examples as well as throughout the specification are by weight unless otherwise indicated.

EXAMPLES

Examples A and B describe the preparation of cationic electrodepositable resins, Example A also containing a polyurethane crosslinker. Examples C and D each describe the preparation of quaternary ammonium salt containing pigment grinding resins.

Examples AA and BB describe the preparation of a pigment paste suitable for use in the electrodeposition bath compositions of the invention. Examples CC and DD describe the preparation of electrodeposition bath premixes for use in the electrodeposition bath compositions of Examples 1 and 2, and Examples 3 and 4, respectively. Example EE describes the preparation of the soluble yttrium solution for use in the bath compositions of Examples 2 and 4. Table 1 illustrates the improvement in scribe creep corrosion resistance observed with the inclusion of soluble yttrium solution in lead-free electrodeposition bath compositions of the invention.

Example A

A polyurethane crosslinker was prepared from a mixture of the following ingredients:

| INGREDIENTS | WEIGHT (grams) | EQUIVALENTS |
|---|---|---|
| Charge I: | | |
| BPA/EO adduct[1] | 2825.1 | 11.461 |
| Ethanol | 703 | 15.282 |
| Propylene glycol | 1161.4 (15.282 moles) | — |
| Methyl isobutyl ketone | 710.8 | — |
| Charge II: | | |
| PAPI 2940[2] | 5042.9 | 38.204 |
| Methyl isobutyl ketone | 1249.3 | — |

[1]Adduct of Bisphenol A and a diol containing 6 ethylene oxide, commercially available as MACOL 98A MOD1 from BASF Corp.
[2]Polymeric methylene diphenyl diisocyanate available from The Dow Chemical Co.

Into a suitably equipped 12 liter round-bottom flask were added the ingredients of Charge I. Under mild agitation these ingredients were heated under a nitrogen blanket to a temperature of 50° C. The PAPI 2940 was added gradually over a period of about 2 hours with the temperature rising to 110° C., followed by a rinse of about 176.6 grams of the methyl isobutyl ketone. The reaction mixture was held at 110° C. until no isocyanate was detected by infrared spectroscopy. The remaining 1072.7 grams of methyl isobutyl ketone was then added to the reaction mixture, which had a final solids content of about 83% (1 hour at 110° C.).

A cationic resin was prepared from a mixture of the following ingredients:

| INGREDIENTS | WEIGHT (grams) | EQUIVALENTS |
|---|---|---|
| Charge I: | | |
| Polyurethane crosslinker as described immediately above | 3658.1 | |
| EPON 880[1] | 1971.6 | 10.487 |
| Bisphenol A | 760.4 | 6.7 |
| BPA/EO adduct[2] | 2.5 | 0.005 |
| TETRONIC 150R1[3] | 0.6 | — |
| Solvent[4] | 192.1 | — |
| Charge II: | | |
| Aminopropyldiethanolamine[5] | 259.5 | 3.204 |
| Diethanolamine | 181.1 | 1.725 |
| Benzyldimethylamine | 3.9 | — |

[1]Diglycidyl ether of Bisphenol A commercially available from Shell Oil and Chemical Co.
[2]Adduct prepared from 1:2 molar ratio of ethoxylated Bisphenol A (9 moles of ethylene oxide per mole of Bisphenol A) and hexahydrophthalic anhydride mixed in the presence of 0.05% triethylamine catalyst and held at 100° C. for 3.5 hours.
[3]Surfactant commercially available from BASF Corp.
[4]Reaction product of 2 moles of dithylene glycol monobutyl ether and 1 mole formaldehyde, 98% active, prepared as described in U.S. Pat. No. 4,891,111 to McCollum et al.
[5]Commercially available from Huntsman Corporation.

To a suitably equipped 12 liter round bottom flask were added the ingredients of Charge I. The reaction mixture was stirred under mild agitation and heated under a nitrogen blanket to a temperature of about 75° C., followed by the addition of Charge II. The reaction mixture was allowed to exotherm and after the exotherm had expired, the reaction temperature was adjusted to about 120° to 123° C. and held at that temperature for about 2 hours. The reaction mixture had an epoxy equivalent weight of greater than 20,000 based on solids, an amine content of 0.77 milliequivalents per gram based on solids, and a Gardner-Holdt bubble viscosity of S/T (when reduced to 50% solids with 1-methoxy-2-propanol).

An aqueous dispersion of the cationic resin prepared above was prepared from a mixture of the following ingredients:

| INGREDIENTS: | WEIGHT (grams) | EQUIVALENTS |
|---|---|---|
| Charge I: | | |
| Sulfamic acid | 155.1 | 1.597 |
| Deionized water | 4144.2 | — |
| Charge II: | | |
| Cationic resin prepared immediately above | 6700.0 | |
| Charge III: | | |
| Gum rosin[1] | 101.8 | |
| Charge IV: | | |
| Deionized water | 4162.8 | |

[1]30% solution of gum rosin (commercially available from Aldrich Chemical Company, Inc.) in methyl isobutyl ketone.

Charge I was added to a bath equipped with an agitator and heated to a temperature of 50° C. At this temperature, the cationic resin was added and mixed for about 30 minutes until thoroughly dispersed, at which time the gum rosin (Charge III) was gradually added. The cationic resin and gum rosin were mixed for 15 minutes, at which time the deionized water of Charge IV was added. The dispersion was heated to a temperature of about 60° to 65° C. and subjected to a reduced pressure of about 20 inches mercury over a period of about 2 hours during which time the methyl isobutyl ketone was removed by vacuum distillation. The resulting dispersion had solids of 41.9% (1 hour at 110° C.).

Example B

A cationic resin was prepared from a mixture of the following ingredients:

| INGREDIENTS: | WEIGHT (grams) | EQUIVALENTS |
|---|---|---|
| Charge I: | | |
| EPON 880 | 376.0 | 2.000 |
| Bisphenol A | 148.0 | 1.300 |
| BPA/EO adduct[1] | 5.2 | 0.020 |
| Solvent[2] | 59.6 | |
| Ethyltriphenyl phosphonium iodide | 0.53 | |
| Charge II: | | |
| Methylethanolamine | 0.1 | 0.001 |
| Diketimine[3] | 235.9 | 0.629 |

[1] Adduct of Bisphenol A and a diol containing 6 ethylene oxide, commercially available as MACOL 98A MOD1 from BASF Corp.
[2] Reaction product of 2 moles of diethylene glycol monobutyl ether and 1 mole formaldehyde, 98% active, prepared as described in U.S. Pat. No. 4,891,111 to McCollum et al.
[3] Diketimine derived from diethylene triamine and methyl isobutyl ketone (73% solids in methyl isobutyl ketone), prepared as described in U.S. Pat. No. 3,947,339 to Jerabek et al.

To a suitably equipped 5-liter flask the ingredients of Charge I were added under mild agitation in the order shown above. The reaction mixture was heated to a temperature of 125° C. under a nitrogen blanket, then allowed to exotherm to a temperature of about 145° to 160° C. and subsequently held for one hour at a temperature of about 145° C. The reaction mixture was then cooled to a temperature of about 125° C. at which time the ingredients of Charge II were added and the reaction mixture was held for two additional hours at that temperature. After the hold period, approximately 85% of the reaction product was slowly poured into an acetic acid solution (28.9 g (0.481 equivalents) and 190.0 grams deionized water) and allowed to mix for 30 minutes. Additional deionized water was added to reduce the dispersion solids to 36% (1 hour @110° C.). The cationic dispersion was then vacuum stripped to remove methyl isobutyl ketone.

Example C

This example describes the preparation of a quaternary ammonium salt containing pigment-grinding resin. Example C-1 describes the preparation of an amine-acid salt quaternizing agent and Example C-2 describes the preparation of an epoxy group-containing polymer that is subsequently quaternized with the amine-acid salt of Example C-1.

Example C-1

The amine-acid salt quaternizinig agent was prepared using the following procedure:

To a suitably equipped 5 liter flask were added 445 parts by weight N, N-dimethylethanolamine. Under mild agitation, 660 parts by weight PAPI 2940 (polymeric diisocyanate commercially available from the Dow Chemical Co.) were added slowly over a 1.5 hour period, followed by a rinse of 22.1 parts by weight of the solvent mentioned above for Examples A and B. During this addition, the reaction mixture was allowed to exotherm to a temperature of about 89° C. and held at that temperature for about 1 hour until complete reaction of the isocyanate as determined by infrared spectroscopy. At that time, 512 parts by weight of an 88% aqueous lactic acid solution were added over a 25 minute period, followed by the addition of about 2136.11 parts by weight of deionized water. The reaction temperature was held at about 80° C. for about 6 hours until a stalled acid value of 70.6 was obtained.

Example C-2

The quaternary ammonium salt group-containing polymer was prepared using the following procedure.

To a suitably equipped 5 liter flask were added, under mild agitation, 528.8 parts by weight EPON 828 (polyglycidyl ether of Bisphenol A commercially available from Shell Oil and Chemical Co.); 224.9 parts by weight of Bisphenol A; 83.7 parts by weight of the solvent mentioned above in Examples A and B; and 0.5 parts by weight of ethyltriphenylphosphonium iodide. The reaction mixture was heated to about 140° C., allowed to exotherm to about 180° C., then cooled to about 160° C. and held at that temperature for about 1 hour. At that time the polymeric product had an epoxy equivalent weight of 982.9. The reaction mixture was then cooled to a temperature of about 130° C. at which time about 164.9 parts by weight of the solvent of Examples A and B was added and the temperature lowered to about 95°–100° C., followed by the addition of about 418.4 parts by weight of the amine-acid quaternizing agent of Example C-1 over a period of 15 minutes, and subsequently followed by the addition of about 1428.1 parts by weight of deionized water. The reaction temperature was held at about 80° C. for approximately 6 hours until the acid number of the reaction product fell below 1.0. The resultant quaternary ammonium salt group-containing pigment grinding resin was further reduced with about 334.7 parts by weight of the solvent of Examples A and B.

Example D

This example describes the preparation of a second quaternary ammonium salt group-containing pigment grinding resin. Example D-1 describes the preparation of an amine-acid salt quaternizing agent and Example D-2 describes the preparation of an epoxy group-containing polymer that is subsequently quaternized with the amine-acid salt of Example D-1.

Example D-1

The amine-acid salt quaternizing agent was prepared using the following procedure.

To a suitably equipped 5 liter flask were added under agitation 267.4 parts by weight N, N-dimethylethanolamine. At a temperature of about 23° C., 396 parts by weight of PAPI 2940 were slowly added over a 1.0 hour period, followed by a rinse of about 13.9 parts by weight of the solvent mentioned above in Examples A and B. The temperature was allowed to exotherm to about 90° C. during this addition and was subsequently held at that temperature for about 45 minutes until the disappearance of the isocyanate as determined by infrared spectroscopy. At that time, 112.8 parts by weight of dimethylcocoamine were added followed by the addition of about 361.3 parts by weight of 88% aqueous lactic acid solution over a 15-minute period. About 695.0 parts by weight of deionized water were then added and the reaction temperature was held at about 85° C. for about 3 hours until a stalled acid value was obtained.

Example D-2

The quaternary ammonium salt group-containing polymer was prepared using the following procedure.

To a suitably equipped 5 liter flask were added 631.7 parts by weight EPON 828; 268.7 parts by weight Bisphenol A; 10.0 parts by weight of the solvent of Examples A and B; and 0.6 parts of ethyltriphenylphosphonium iodide. The reaction mixture was heated to about 140° C. and allowed to exotherm to a temperature of about 180° C. at which time the reaction mixture was cooled to 160° C. and held for about 1 hour to an epoxy equivalent weight of 991.0. The reaction was further cooled to about 130° C. and 421.2 parts by weight of ethoxylated Bisphenol A (6 moles of ethylene oxide per mole of Bisphenol A) were added. Cooling was then continued until a temperature of about 80° C. was obtained, at which time 346.4 parts by weight of the amine-acid salt quaternizing agent of Example D-1 were added over a period of about 30 to 35 minutes, followed by the addition of 404.8 parts by weight of deionized water. The reaction mixture was held at a temperature of about 80° C. for about 6 hours until the acid number dropped below 1.0. The resultant quaternary ammonium salt group-containing pigment grinding resin was further reduced with 2232.2 parts by weight of deionized water.

Example AA

This example describes the preparation of a pigment paste suitable for use in the electrodeposition bath compositions of the present invention. The pigment paste was prepared from a mixture of the following ingredients:

| INGREDIENTS | WEIGHT (grams) |
|---|---|
| Quaternary ammonium salt group-containing grind resin of Example C | 2002.4 |
| Surfynol GA[1] | 30.8 |
| Deionized water | 400 |
| Ti-Pure R-900[2] | 1725.0 |
| CSX-333[3] | 39.0 |
| Catalyst paste[4] | 772.1 |
| Deionized water | 284.7 |

[1]Nonionic surfactant available from Air Products and Chemicals, Inc.
[2]Titanium dioxide pigment available from E. I. Dupont de Nemours & Co. (Inc.)
[3]Carbon black beads available from Cabot Corp.
[4]Catalyst paste prepared from a mixture of the following ingredients:

| INGREDIENTS | WEIGHT (grams) |
|---|---|
| Quaternary ammonium salt group-containing grind resin of Example D | 632.0 |
| Deionized water | 92.0 |
| n-Butoxypropanol | 19.0 |
| STANN BO[1] | 368.0 |

[1]Di-n-butyltin oxide catalyst available from Sankyo Organic Chemicals Co., Ltd.

The above ingredients were added, in the order shown, under high shear agitation. After the ingredients were thoroughly blended, the pigment paste was transferred to a vertical sand mill and ground to a Hegman value of about 7.25.

Example BB

This example describes the preparation of a pigment paste suitable for use in the electrodeposition bath compositions of the present invention. The pigment paste was prepared from a mixture of the following ingredients:

| INGREDIENTS | WEIGHT (grams) |
|---|---|
| Quaternary ammonium salt group-containing grind resin of Example C | 2002.4 |
| Surfynol GA[1] | 30.8 |
| Deionized water | 400 |
| Ti-Pure R-900[2] | 1776.4 |
| CSX-333[3] | 39.9 |
| Calcium oxalate hydrate[4] | 61.6 |
| Catalyst paste[5] | 772.1 |
| Deionized water | 284.7 |

[1]Nonionic surfactant available from Air Products and Chemicals, Inc.
[2]Titanium dioxide pigment available from E. I. Dupont de Nemours & Co. (Inc.)
[3]Carbon black beads available from Cabot Corp.
[4]Calcium oxalate hydrate commercially available from Aldrich Chemical Company Inc.
[5]Catalyst paste prepared from a mixture of the following ingredients:

| INGREDIENTS | WEIGHT (grams) |
|---|---|
| Quaternary ammonium salt group-containing grind resin of Example D | 632.0 |
| Deionized water | 92.0 |
| n-Butoxypropanol | 19.0 |
| STANN BO | 368.0 |

The above ingredients were added sequentially under high shear agitation. After the ingredients were thoroughly blended, the pigment paste was transferred to a vertical sand mill and ground to a Hegman value of about 7.25.

Example CC

This example describes the preparation of an electrodeposition bath premix for use in the electrodeposition bath compositions of Examples 1 and 2 below. The electrodeposition bath premix was prepared from a mixture of the following ingredients:

| INGREDIENTS | WEIGHT (grams) |
|---|---|
| Cationic resin of Example A | 3739.6 |
| Cationic resin of Example B | 226 |
| Flexibilizer[1] | 497 |
| Flow additive[2] | 80 |
| Solvent of Examples A and B | 67.4 |
| Pigment paste of Example AA | 623.8 |
| Phenylphosphonic acid[3] | 1.5 |
| Deionized water | 4764.7 |

[1]Reaction product of JEFFAMINE D400 (polyoxypropylenediamine available from Huntsman Corporation) and DER-732 (aliphatic epoxide commercially available from the Dow Chemical Co), prepared as described in U.S. Pat. No. 4,423,166 to Moriarity et al.
[2]Reaction product of methylamine; propylene oxide; and toluene diisocyanate as described in U.S. Pat. No. 5,348,578.

-continued

| INGREDIENTS | WEIGHT (grams) |
|---|---|

[3]Phenylphosphonic acid commercially available from Aldrich Chemical Company, Inc.

Example DD

This example describes the preparation of an electrodeposition bath premix for use in the electrodeposition bath compositions of Examples 3 and 4 below. The electrodeposition bath premix was prepared from a mixture of the following ingredients:

| INGREDIENTS | WEIGHT(grams) |
|---|---|
| Cationic resin of Example A | 3739.6 |
| Cationic resin of Example B | 226 |
| Flexibilizer of Example CC | 497 |
| Flow additive of Example CC | 80 |
| Solvent of Examples A and B | 67.4 |
| Pigment paste of Example BB | 623.8 |
| Phenylphosphonic acid[1] | 1.5 |
| Deionized water | 4764.7 |

[1]Phenylphosphonic acid commercially available from Aldrich Chemical Company, Inc.

Example EE

This example describes the preparation of a soluble yttrium solution for use in the electrodeposition bath compositions of the Examples 2 and 4 below. The soluble yttrium solution was prepared from a mixture of the following ingredients:

| INGREDIENTS | WEIGHT (grams) |
|---|---|
| Yttrium nitrate hexahydrate[1] | 43.1 |
| Deionized water | 956.9 |

[1]Commercially available from Aldrich Chemical Company, Inc.

Examples 1–4

Examples 2 and 4 describe the preparation of electrodeposition bath compositions of the invention which contain 500 ppm of the soluble yttrium solution of Example EE. Comparative Examples 1 and 3 contain no soluble yttrium solution. The electrodeposition bath compositions were prepared from a mixture of the following ingredients:

| ppm soluble yttrium: | 0 | 500 |
|---|---|---|
| Ingredients: | Weight (grams) | Weight (grams) |
| | EXAMPLE 1 (Comparative) | EXAMPLE 2 |
| Premix of Example CC ultrafiltered 20% | 2160 | 2160 |
| Yttrium solution of Example EE | 0.0 | 135 |
| Deionized water | 540 | 405 |
| | EXAMPLE 3 | |

| ppm soluble yttrium: | 0 | 500 |
|---|---|---|
| Ingredients: | Weight (grams) | Weight (grams) |
| | (Comparative) | EXAMPLE 4 |
| Premix of Example DD ultrafiltered 20% | 2160 | 2160 |
| Yttrium solution of Example EE | 0.0 | 135 |
| Deionized water | 540 | 405 |

Electrodeposition Bath Preparation

Under agitation, the cationic resin of Example B was diluted with approximately 15% of the total deionized water. The diluted resin was then stirred into the cationic resin of Example A. The flexibilizer resin was separately diluted with the solvent under agitation, then further diluted with about 30% of the total deionized water before adding to the cationic resin blend. The flow control additive was then added. The phenylphosphonic acid was diluted with about 5% of the total deionized water before adding to the cationic resin blend. The pigment paste was separately diluted with the remaining deionized water and added to the above resin blend. Final bath solids were about 22.5%, with a pigment to resin ratio of 0.12:1.0. The test baths were 20% ultrafiltered and replenished with only fresh deionized water for Comparative Examples 1 and 3, and with fresh deionized water and the prescribed amount of soluble yttrium solution in Examples 2 and 4 prior to electrocoating.

Electrocoating Procedure

Each of the electrodeposition bath compositions of Examples 1 through 4 above were electrodeposited onto non-phosphated cold rolled steel panels, commercially available from ACT Laboratories. Conditions for cationic electrodeposition of each were as follows: 2 minutes at 90° F. at 160–180 volts to yield a cured film thickness of 0.6 to 0.8 mils. The coated substrate was cured in an electric oven at 340° F. for 20 minutes.

Testing Procedure

Each of the coated untreated steel test panels was scribed, cutting through the coating to the metal substrate, in an "X" pattern. The test panels were then subjected to salt spray testing in accordance with ASTB 117. Test panels were evaluated for "scribe creep" corrosion and visual appearance. Scribe creep is reported as average distance (in millimeters) of corrosion from the scribe mark. Test results are reported in the following TABLE 1.

TABLE 1

| EXAMPLE | 1 | 2 | 3 | 4 |
|---|---|---|---|---|
| Soluble yttrium | 0 ppm | 500 ppm | 0 ppm | 500 ppm |
| Scribe Creep (mm) | 12 | 7 | 10 | 5 |

The data reported in the above TABLE 1 illustrates the improvement in scribe creep corrosion resistance observed with the inclusion of soluble yttrium solutions in the electrodeposition baths of the invention.

We claim:

1. In an electrodepositable coating composition, said coating composition comprising a resinous phase dispersed in an aqueous medium, said resinous phase comprising:
   (a) an active hydrogen group-containing ionic electrodepositable resin, and
   (b) a curing agent having functional groups reactive with the active hydrogen groups of (a), the improvement comprising the inclusion in the composition of at least one soluble yttrium compound present in an amount from about 0.005 percent by weight to about 5 percent by weight of yttrium based on weight of total resin solids of the electrodepositable coating composition.

2. The electrodepositable coating composition of claim 1 wherein the amount of yttrium present is not more than about 1.0 percent by weight based on weight of total resin solids in the electrodepositable coating composition.

3. The electrodepositable coating composition of claim 1 wherein said composition is substantially free of lead.

4. The electrodepositable coating, composition of claim 1 wherein said resinous phase further comprises at least one non-lead pigment.

5. The electrodepositable coating composition of claim 1 wherein said active hydrogen containing ionic resin is cationic.

6. The electrodepositable coating composition of claim 1 wherein said yttrium compound is selected from the group consisting of yttrium oxide, yttrium nitrate, yttrium acetate, yttrium chloride, yttrium sulfamate, yttrium lactate, yttrium formate and mixtures thereof.

7. The electrodepositable coating composition of claim 6 wherein said yttrium compound is yttrium oxide.

8. The electrodepositable coating composition of claim 1 wherein said yttrium compound is selected from the group consisting of yttrium sulfamate, yttrium acetate, yttrium lactate, yttrium formate and yttrium nitrate and mixtures thereof.

9. In an electrodeposition bath, said electrodeposition bath comprising a resinous phase dispersed in an aqueous medium, said resinous phase comprising:

(a) an active hydrogen group-containing ionic electrodepositable resin, and (b) a curing agent having functional groups reactive with the active hydrogen groups of (a), the improvement comprising an electrodeposition bath containing at least one soluble yttrium compound present in an amount from about 10 parts per million to about 10.000 parts per million of yttrium, based on electrodeposition bath weight.

10. The electrodeposition bath of claim 9 wherein the amount of yttrium is not more than about 1000 parts per million based on electrodeposition bath weight.

11. The electrodeposition bath of claim 9 wherein said bath is substantially free of lead.

12. The electrodeposition bath of claim 9 wherein said resinous phase further comprises at least one non-lead pigment.

13. The electrodeposition bath of claim 9 wherein said active hydrogen group-containing ionic resin is cationic.

14. The electrodeposition bath of claim 9 wherein said yttrium compound is selected from the group consisting of yttrium oxide, yttrium nitrate, yttrium acetate, yttrium chloride, yttrium sulfamate, yttrium lactate, yttrium formate and mixtures thereof.

15. The electrodeposition bath of claim 14 wherein said yttrium compound is yttrium oxide.

16. The electrodeposition bath of claim 9 wherein said yttrium compound is selected from the group consisting of yttrium sulfamate, yttrium acetate, yttrium lactate, yttrium formate and yttrium nitrate and mixtures thereof.

17. A method of electrocoating a conductive substrate serving as a charged electrode in an electrical circuit comprising said electrode and an oppositely charged counter electrode, said electrodes being immersed in an aqueous electrocoating composition, comprising passing electric current between said electrodes to cause deposition of the electrocoating composition on the substrate as a substantially continuous film, the aqueous electrocoating composition comprising:

(a) an active hydrogen group-containing ionic electrodepositable resin, and (b) a curing agent having functional groups reactive with the active hydrogen groups of (a), wherein the improvement comprises an electrodeposition bath containing at least one soluble yttrium compound present in an amount about 10 parts per million to about 10,000 parts per million of total, based on electrodeposition bath weight.

18. The method of claim 17 wherein the amount of yttrium is not more than about 1,000 parts per million based on electrodeposition bath weight.

19. The method of claim 17 wherein the amount of total yttrium is not more than about 500 parts per million, based on electrodeposition bath weight.

20. The method of claim 17 wherein the electrodeposition bath is substantially free of lead.

21. The method of claim 17 wherein said resinous phase further comprises at least one non-lead pigment.

22. The method of claim 17 wherein said yttrium compound is yttrium oxide.

23. The method of claim 17 wherein the substrate is the cathode.

24. The method of claim 17 wherein said substrate is comprised of untreated steel.

25. The method of claim 17 wherein said substrate is comprised of galvanized steel.

26. The method of claim 17 wherein said substrate is comprised of aluminum.

27. The method of claim 17 wherein said yttrium compound is selected from the group consisting of yttrium sulfamate, yttrium acetate, yttrium lactate, yttrium formate, yttrium nitrate and mixtures thereof.

\* \* \* \* \*